United States Patent
Wong et al.

(10) Patent No.: US 6,240,480 B1
(45) Date of Patent: May 29, 2001

(54) BUS BRIDGE THAT PROVIDES SELECTION OF OPTIMUM TIMING SPEED FOR TRANSACTIONS

(75) Inventors: Jacques Wong, Santa Clara; Scott Waldron, Belmont; Mark Knecht, Los Gatos, all of CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 0 days.

(21) Appl. No.: 09/074,578

(22) Filed: May 7, 1998

(51) Int. Cl.[7] .......................... G06F 13/28; G06F 13/38; G06F 13/40

(52) U.S. Cl. .......................... 710/126; 710/25; 710/126; 710/127

(58) Field of Search .......................... 710/128, 129, 710/126, 112, 118, 5, 2, 10, 25, 101, 60, 107, 1, 4, 26, 62, 127; 711/100, 143; 713/501, 500, 600; 709/28

(56) References Cited

U.S. PATENT DOCUMENTS

| | | | |
|---|---|---|---|
| 5,568,621 | * 10/1996 | Wooten | 710/112 |
| 5,634,073 | * 5/1997 | Collins et al. | 710/5 |
| 5,727,171 | * 3/1998 | Inchetta, Jr. | 710/107 |
| 5,761,533 | * 6/1998 | Aldereguia et al. | 710/25 |
| 5,781,748 | * 7/1998 | Santos et al. | 710/128 |
| 5,790,831 | * 8/1998 | Lin et al. | 710/101 |
| 5,802,392 | * 9/1998 | Epstein et al. | 710/4 |
| 5,835,741 | * 11/1998 | Elkhoury et al. | 710/129 |
| 5,838,932 | * 11/1998 | Alzien | 710/128 |
| 5,878,237 | * 3/1999 | Olarig | 710/128 |
| 5,960,213 | * 9/1999 | Wilson | 710/2 |
| 6,131,127 | * 10/2000 | Gafken et al. | 710/1 |

* cited by examiner

*Primary Examiner*—Thomas Lee
*Assistant Examiner*—Chun Cao

(57) ABSTRACT

An improved bus bridge in a computer system for connecting a first data bus and a second data bus, said bus bridge having means for connecting said first and second buses, means for receiving an address representing a transaction on said first bus, means for decoding said address, means for claiming the transaction on said first bus corresponding to said address, and means for passing said transaction to said second bus, wherein the improvement comprises: (a) means for determining if said address decodes into one of a plurality of address ranges programmed in said bridge device; (b) means for determining a timing speed for the transaction corresponding to said address in accordance with the address range for said address; and (d) means for asserting a signal for claiming the transaction at said determined timing speed.

14 Claims, 6 Drawing Sheets

FIG. 4

| Byte # | 31 | 16 | 15 | 0 |
|---|---|---|---|---|
| 00h | Device ID | | Vendor ID | |
| 04h | Status | | Command | |
| 08h | Class Code | | | Revision ID |
| 0Ch | BIST | Header Type | Latency Timer | Cache Line Size |
| 10h | Reserved | | | |
| 14h | Reserved | | | |
| 18h | Secondary Latency Timer | Subordinate Bus Number | Secondary Bus Number | Primary Bus Number |
| 1Ch | Secondary Status | | I/O Limit | I/O Base |
| 20h | Memory Limit | | Memory Base | |
| 24h | Prefetchable Memory Limit | | Prefetchable Memory Base | |
| 28h | Reserved | | | |
| 2Ch | Reserved | | | |
| 30h | I/O Limit Upper 16 Bits | | I/O Base Upper 16 Bits | |
| 34h | Reserved | | | |
| 38h | Expansion ROM Base Address | | | |
| 3Ch | Bridge Control | | Interrupt Pin | Interrupt Line |
| 40h | | | | |
| 44h | | | | |
| 48h | | | | |
| 4Ch | | | | |
| 50h – 7Fh | | | | |
| 80h | DEVSEL Timing | | | |
| 84h | | | | |
| 88h | | | | |
| 8Ch | | | | |
| 90h – FBh | | | | |
| FCh | PC Architecture Legacy Support | | | |

130, 132

BUS BRIDGE THAT PROVIDES SELECTION OF OPTIMUM TIMING SPEED FOR TRANSACTIONS

BACKGROUND OF THE INVENTION

1. Field of the Invention

The present invention generally relates to computer bus architectures and methods for transference of data, and, in particular, relates to bus bridge architectures for connecting two or more buses and for efficient data transference to and from the buses.

2. Description of the Prior Art

The disclosure herein utilizes Peripheral Component Interconnect (PCI) architecture for illustration purposes where the present invention and the embodiments thereof are not limited to this particular bus architecture. The PCI bus is a high performance 32-bit or 64-bit bus with multiplexed address and data lines. It is intended for use as an interconnect mechanism between highly integrated peripheral controller components, peripheral add-in boards, and processor/memory systems, providing high bandwidth throughput demanded by modem graphics-oriented operating systems such as Windows and OS/2. It is typically found in (but not limited to) IBM compatible personal computer systems. The specifications for the PCI bus standard is provided in the following documents and are incorporated herein by reference: PCI Local Bus Specification, revision 2.1; PCI-to-PCI Bridge Specification, revision 1.0; PCI System Design Guide, revision 1.0; and PCI BIOS Specification, revision 2.1. These documents are available from a consortium of industry partners known as the PCI Special Interest Group (SIG) and are collectively referred to as the PCI Specifications in this disclosure.

FIG. 1 shows one implementation of a PCI bus architecture. Here, the central processing unit (CPU) 10 is connected to a Host/PCI cache bridge 12 via a CPU local bus 14. The Host bridge 12 serves as a bridge to other buses, including a memory bus 16 connected to main memory 18 and a PCI bus 20. Via the Host bridge 12 and the PCI bus 20, the CPU is able to communicate with a number of peripheral devices, including an audio device 22, a motion video device 24 and its video memory 26, a SCSI host bus adapter 28 connecting several other SCSI devices, a LAN adapter 30, and a graphics adapter 32 and its video frame buffer 34. The PCI bus 20 can also communicate with other bus types through the use of a bus-specific bridge 36 and the corresponding bus 38.

Typical PCI bus implementations will support up to four add-in board connectors on the motherboard where the connectors are Micro Channel (MC)-style connectors. PCI expansion cards are designed with an edge connector insertable into the add-in board connectors on a motherboard.

However, a system incorporating a single bus has some limitations. For example, a bus can only support a limited number of expansion connectors due to the fact that a bus will not function properly when there are too many electrical loads (i.e. devices) placed on it. Moreover, the devices that populate a particular bus may not be able to co-exist in an efficient manner in a set-up where all the devices demand high levels of bus time—causing an overall degradation in the performance of the system.

These problems can be solved by adding one or more additional PCI buses into the system and re-distributing the device population. The PCI Specifications provides the definition of a PCI-to-PCI bridge device. This device can either be embedded as an integrated circuit on a PCI bus or may be in the form of an add-in card that is pluggable in a PCI expansion connector. The PCI-to-PCI bridge provides a bridge from one PCI bus to another PCI bus, and it causes one electrical load on its host PCI bus. The new PCI bus can then support a number of additional PCI compatible devices and/or PCI expansion connectors. The electrical loading constraint is therefore solved because the loading constraint is on a per bus basis, not on a system basis. Of course, the power supply in the host system must be capable of supplying sufficient power for the load imposed by the additional devices residing on the new bus(es).

The PCI bridge provides a low latency path through which the processor may access PCI devices mapped anywhere in the memory space or the I/O address spaces. It also provides a high bandwidth path allowing PCI masters direct access to the main memory. The bridge may optionally include such functions as data buffering/posting and PCI central functions (e.g. arbitration). Terminology wise, the PCI bus closest to the host processor is referred to as the primary bus, and the PCI bus that resides behind a PCI-to-PCI bridge is referred to as a subordinate bus where the subordinate bus farthest from the host processor is called the secondary bus.

FIG. 2 illustrates an implementation of a PCI bus system with two PCI-to-PCI bridges connecting to two levels of PCI buses. Here, the CPU 50 is directly connected to the host bus 52. The system memory 54 is connected to the host bus 52 via system memory controller 56. A host-to-PCI bridge 58 establishes a connection between a host bus 52 and a downstream subordinate PCI bus 60 where two PCI devices 62 are connected to it. The subordinate PCI bus 60 further connects to another downstream PCI bus 64 via another PCI-to-PCI bridge 66. PCI bus 64, being the furthest from the host bus, is referred to as the secondary bus and is connected to two PCI devices 68. By using PCI-to-PCI bridges to connect to other PCI buses, architectures overcoming the problem of bus overloading and permitting the expansion of buses are created.

The PCI-to-PCI bridge functions as a traffic coordinator between two PCI buses. The bridge never initiates a transaction on either PCI bus on its own. Its job is to monitor each transaction that is initiated on the two PCI buses and to decide whether or not to pass the transaction through to the opposite PCI bus. When the bridge determines that a transaction on one bus needs to be passed to the other bus, the bridge must act as the target of the transaction on the originating bus and as the initiator of the new transaction on the destination bus. The fact that the bridge resides between the initiator and the target is invisible to the initiator as well as to the target. In addition to determining if a transaction initiated on one bus must be passed through to the other, the bridge also supports additional functions as specified by the PCI Specifications. A bridge may also incorporate a set of device-specific, memory-mapped or IO-mapped registers that control its own functionality. In this case, it must recognize and permit accesses to these registers.

To start a transaction from an initiating device to a targeted device, the initiator sends out a set of signals on to the bus. Each device on the bus having been programmed to claim addresses within a specific address range decodes the signal. The device decoding a valid address then sends out a signal claiming the transaction. The signals involved in such a transaction are illustrated in FIG. 3 and explained below.

The clock (CLK) signal is an input to all devices residing on the bus. It provides timing for all transactions, including bus arbitration. The state of all input signals are 'don't-care' at all other times. All PCI timing parameters are specified with respect to the rising-edge of the CLK signal. As a result, all actions on the PCI bus are synchronized to the CLK signal.

The cycle frame (FRAME#) signal is driven by the initiator and it indicates the start (when it is first asserted) and duration (the duration of its assertion) of a transaction. The initiator in acquiring bus ownership, by receiving GNT#, samples the FRAME# and IRDY# signals to determine if both signals are de-asserted on the same rising-edge of the CLK signal. Once the bus is acquired, the initiator asserts the FRAME# signal for the duration of the transaction. A transaction may consist of one or more data transfers between the initiator and the addressed target. The FRAME# signal is de-asserted when the initiator is ready to complete the final data phase.

The initiator Ready (IRDY#) signal is driven by the current bus master (the initiator of the transaction). During a write operation, IRDY#-asserted indicates that the initiator is driving valid data onto the data bus. During a read operation, IRDY#-asserted indicates that the initiator is ready to accept data from the currently-addressed target.

The Target Ready (TRDY#) signal is driven by the currently-addressed target device. It is asserted when the target is ready to complete the current data phase (data transfer). A data phase is completed when the target is asserting TRDY# and the initiator is asserting IRDY# at the rising-edge of the CLK signal. During a read operation, TRDY#-asserted indicates that the target is driving valid data onto the data bus. During a write operation, TRDY# asserted indicates that the target is ready to accept data from the master. Wait states are inserted in the current data phase until both TRDY# and IRDY# are sampled asserted.

The Initialization Device Select (IDSEL) signal (not shown) is an input to the PCI device and is used as a chip select signal during an access to one of the device's configuration registers.

The Device Select (DEVSEL#) signal is asserted by a target when the target has decoded the address and determined that it is the target of the current transaction. It acts as an input to the initiator. If a master initiates a transfer and it does not detect DEVSEL# active in four CLK periods, it must assume that the target cannot respond or that the address is unpopulated. The DEVSEL# signal may be driven one, two, three or four clock cycles following the address phase as shown, and they are defined as fast (one clock cycle), medium (two clock cycles), slow (three clock cycles), or subtractive timing (four clock cycles). By definition, all PCI device address decoders are fast, medium, or slow. The timing is selected by the target in accordance with the target's ability to respond to the transaction. A target having the ability to provide a response in one clock cycle following the address phase will assert fast DEVSEL# timing. Slower devices will assert medium or slow DEVSEL# timing. Ideally, faster throughput is achieved when all devices on a bus asserts fast DEVSEL# timing.

The bus bridge may claim transactions in one of two situations. In the first situation, also known as subtractive decoding, when a transaction is not claimed by any other PCI device within the third clock period of time, the bus bridge may assert the DEVSEL# signal and pass the transaction through to the subordinate bus. The bus bridge can determine that no other PCI device has claimed a transaction by monitoring the state of the DEVSEL# signal generated by the other PCI-compliant devices. If the DEVSEL# signal is not sampled asserted within three clock periods after the start of a transaction, no other PCI device has claimed the transaction. The bus bridge may then claim the transaction by asserting the DEVSEL# signal at the fourth clock cycle of the transaction (subtractive decoding).

In the second situation, the bus is configured to employ positive address decoding. During system configuration, the bridge is configured to recognize certain memory and/or IO address ranges. Upon recognizing an address within this pre-assigned range, the bridge may assert DEVSEL# immediately (without waiting for the DEVSEL# signal to timeout) to claim the transaction. The bridge then passes the transaction through onto the subordinate bus. In this fashion, transaction to the subordinate bus is not hampered by having to wait at least three clock periods before the bus bridge claims the transaction and passes the transaction onto the subordinate bus. The ISA bus environment is one that depends heavily on subtractive decoding to claim transactions.

The devices that reside behind a bus bridge may consist of only memory, only I/O, or a combination of memory and I/O devices. Furthermore, some of the I/O devices may be mapped into memory space while others are mapped into I/O space. The configuration program automatically detects the presence, type and address space requirements of these devices and allocates space to them by programming their address decoders to recognize the address ranges it assigns to them. The corresponding address ranges such as memory, I/O prefetchable memory, ISA/VGA, and I/O Legacy addresses nevertheless poses a complicated decoding problem for the bus bridge. In order to simplify the decoding process, bus bridges tend to offer medium speed DEVSEL# timing regardless of the devices and their respective optimal DEVSEL# timing. As a consequence, optimal throughput from the subordinate bus is not achieved.

Furthermore, by programming the bridge at one specific DEVSEL# timing, it poses limitations as to the DEVSEL# timing speeds for other devices on the same bus as the bus bridge device. Ideally, it would be desirable to be able to program the DEVSEL# timing speed for each device independent of the other devices. In this manner, maximum timing flexibility and the most efficient timing speed for each of the respective devices can be achieved.

It is therefore desirable to have a method and apparatus for achieving efficient device select speed for the devices on the subordinate bus(es).

SUMMARY OF THE INVENTION

It is therefore an object of the present invention to provide a method and architecture that provides the optimal device-select speed for devices on a subordinate bus.

It is another object of the present invention to provide a method and architecture that provides support for legacy devices and their corresponding address ranges.

It is still another object of the present invention to provide a method and architecture that provides for optional aliasing decoding of legacy device addresses.

Briefly, a presently preferred embodiment of the present invention includes an improved bus bridge in a computer system for connecting a first data bus and a second data bus, said bus bridge having means for connecting said first and second buses, means for receiving an address representing a transaction on said first bus, means for decoding said address, means for claiming the transaction on said first bus corresponding to said address, and means for passing said transaction to said second bus, wherein the improvement comprises: (a) means for determining if said address decodes into one of a plurality of address ranges programmed in said bridge device; (b) means for determining a timing speed for the transaction corresponding to said address in accordance with the address range for said address; and (d) means for asserting a signal for claiming the transaction at said determined timing speed.

An advantage of the present invention is that it provides a method and architecture that provides the optimal device-select speed for devices on a subordinate bus.

Another advantage of the present invention is that it provides a method and architecture that provides support for legacy devices and their corresponding address ranges.

Still another advantage of the present invention is that it provides a method and architecture that provides for optional aliasing decoding of legacy device addresses.

These and other features and advantages of the present invention will be understood upon examining the figures and reading the following detailed description of preferred embodiment of the invention.

IN THE DRAWINGS

FIG. 4 illustrates a type one configuration register header for a bus bridge in accordance with the preferred embodiment.

DETAILED DESCRIPTION OF THE PREFERRED EMBODIMENTS

Figure 1:
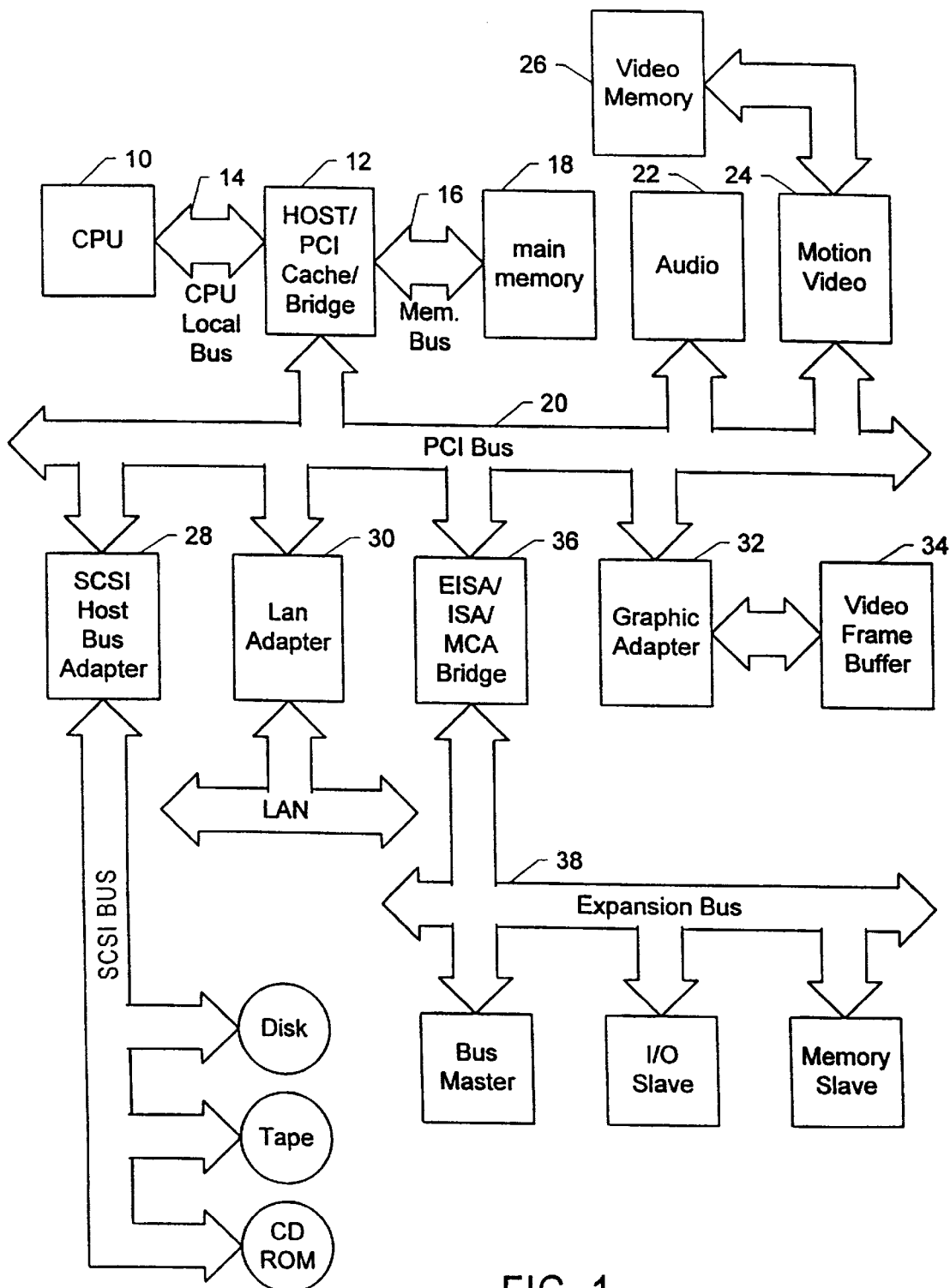
FIG. 1 illustrates an example of a PCI bus architecture in accordance with the PCI Specifications.
Figure 2:
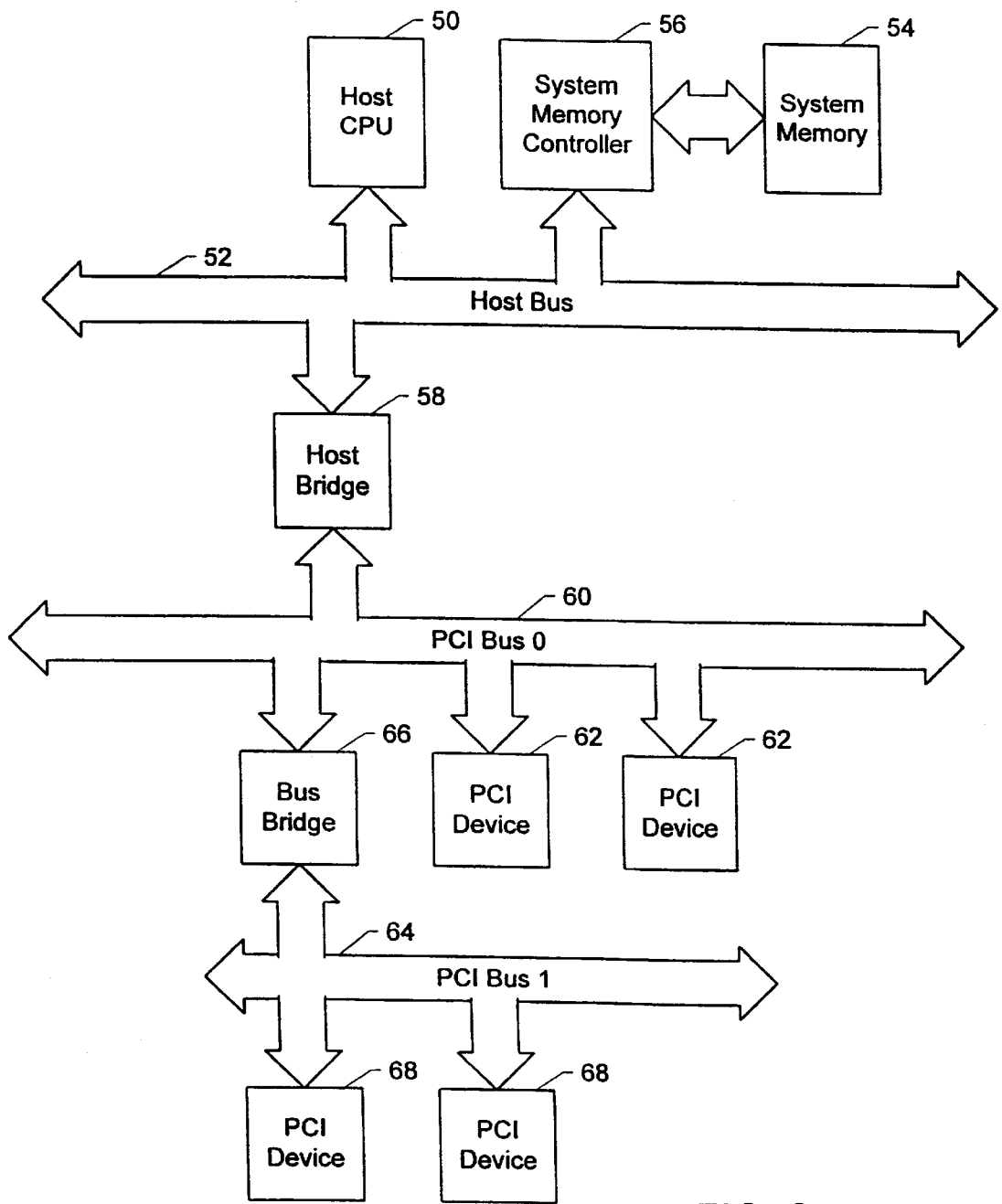
FIG. 2 illustrates an example of multiple level PCI bus architecture whereby the PCI buses communicate with each other via PCI-to-PCI bridges.
Figure 3:
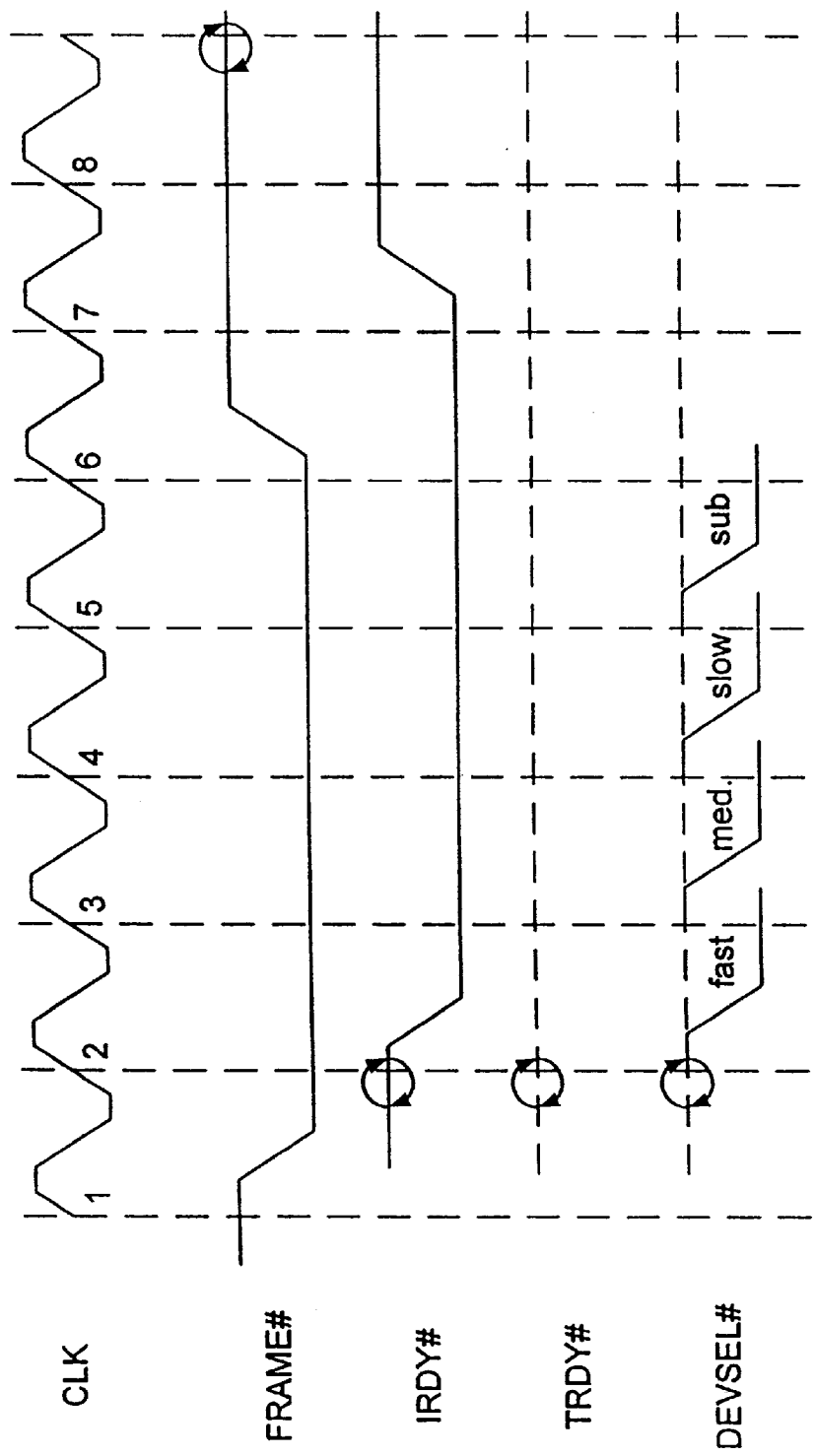
FIG. 3 illustrates a timing diagram of bus signals.

In order to implement the preferred embodiment of the present invention, the bridge configuration space header is modified to provide for a DEVSEL# timing register which is illustrated in FIG. 4.

There is a configuration space header for each PCI device and is comprised of a block of 64 configuration doublewords reserved for the implementation of the respective configuration registers. The format, or usage, of the first 16 doublewords is predefined by the PCI Specifications. This area is also referred to as the device's configuration header region. The PCI Specifications currently defines two header formats, referred to as header types zero and one. Header type one is defined for PCI-to-PCI bridges, while header type zero is used for all other devices.

FIG. 4 illustrates a type one configuration header for PCI bridges. In one section 130, the first 16 of the 64 doublewords of configuration header associated with the bridge is as defined by the PCI Specifications, which includes device ID, vendor ID, status register, command register, class code, revision ID, and several other pertinent pieces of information regarding the PCI-to-PCI bridge or status thereof In a second section 132, the remaining 48 doublewords of the configuration header, the definition of which is an aspect of the preferred embodiment of the present invention, is illustrated.

In operation, the computer is powered on and the configuration software must scan the PCI bus, or buses, to determine what PCI devices exist and the configuration requirement of each. This process is commonly referred to as scanning or probing the bus. In order to facilitate this process, all PCI devices implements a base set of configuration registers defined by the PCI Specifications known as type 0 configuration header. Depending on its operational characteristics, a device may also implement other required or operational configuration registers defined by the specification. In addition, the specification sets aside a number of additional configuration locations for the implementation of device-specific configuration registers.

A register of interest which is an aspect of the preferred embodiment of the present invention is the DEVSEL# timing register illustrated at location 83h in the configuration header space for the PCI bridge.

The DEVSEL# timing register is eight bits in length and can be programmed to specified DEVSEL# timing speeds. Table 1 illustrates the bit specifications.

| DEVSEL# TIMING Bit | Description | RESET | ACCESS |
|---|---|---|---|
| 1:0 Primary Bus DEVSEL# Timing | Timing of p_DEVSEL# during selection at Memory addresses described by the ranges contained in:<br>The I/O Base Address and I/O Limit Address registers. (1Ch & 1Dh)<br>The Memory Base Address and Memory Limit Address registers. (20h & 22h)<br>The Prefetchable Memory Base Address and Prefetchable Memory Limit Address registers. (24h & 26h)<br>The follow are the legal values for bits 1:0:<br>00 - Decodes FAST speed DEVSEL# timing for these accesses.<br>01 - Decodes MEDIUM speed DEVSEL# timing forthese accesses.<br>10 - Decodes SLOW speed DEVSEL# timing for these accesses.<br>11 - Decodes SUBTRACTIVE decoding on DEVSEL# for these accesses. | 00b | R/W |
| 3:2 Primary Bus LEGACY Timing | Timing of p_DEVSEL# during selection at Legacy I/O addresses decoded by any bit enabled in the Legacy Support Register. (Fch)<br>The follow are the legal values for bits 3:2:<br>00 - Decodes FAST speed DEVSEL# timing for these accesses.<br>01 - Decodes MEDIUM speed DEVSEL# timing for these accesses.<br>10 - Decodes SLOW speed DEVSEL# timing for these accesses.<br>11 - Decodes SUBTRACTIVE decoding on DEVSEL# for these accesses. | 00b | R/W |
| 5:4 Primary Bus ISA Timing | Timing of p_DEVSEL# during selection during decodes at any ISA/VGA addresses if the ISA Enable or VGA Enable bits are enabled in the Bridge control Register. (3Eh) | 10b | R/W |

-continued

| DEVSEL# TIMING Bit | Description | RESET | ACCESS |
|---|---|---|---|
| | The follow are the legal values for bits 5:4:<br>00 - Decodes FAST speed DEVSEL# timing for these accesses.<br>01 - Decodes MEDIUM speed DEVSEL# timing for these accesses.<br>10 - Decodes SLOW speed DEVSEL# timing for these accesses.<br>11 - Decodes SUBTRACTIVE decoding on DEVSEL# for these accesses. | | |
| 7:6<br>Secondary<br>Bus<br>DEVSEL#<br>Timing | Timing of s_DEVSEL# during any selection<br>The follow are the legal values for bits 7:6:<br>00 - Decodes FAST speed DEVSEL# timing for these accesses.<br>01 - Decodes MEDIUM speed DEVSEL# timing for these accesses.<br>10 - Decodes SLOW speed DEVSEL# timing for these accesses.<br>11 - Decodes SUBTRACTIVE decoding on DEVSEL# for these accesses. | 00b | R/W |

As is listed in Table 1, DEVSEL# timing bits 0 and 1 specify primary bus DEVSEL# timing speed for memory address ranges described by (1) the I/O Base register and the I/O Limit register at locations 1Ch and 1Dh, respectively (see FIG. 4); (2) the Memory Base Address register and the Memory Limit Address register at locations 20$h$ and 22$h$ respectively (see FIG. 4); and (3) the Prefetchable Memory Base Address register and the Memory Limit Address register at locations 24$h$ and 26$h$, respectively (see FIG. 4). Depending on the values programmed for bits 1:0, the DEVSEL# timing speed can be set for Fast, Medium, or Slow speeds or subtractive decoding.

DEVSEL# Timing bits 2 and 3 specify primary bus Legacy devices timing speed. This specification permits the support of legacy devices behind the bridge where legacy devices generally are devices designed for older style ISA systems. The specification for the legacy devices is provided by a PC Architecture Legacy Support register located at location FCh in the configuration header space and is further explained by Table 2 below. Depending on the values assigned to bits 3:2 of the DEVSEL# Timing register, the speed can be Fast, Medium, or Slow, or subtractive decoding as is shown in Table 1.

DEVSEL# Timing bits 4 and 5 designate primary bus ISA/VGA timing speed for ISA/VGA addresses if the ISA Enable bit or VGA Enable bit in the Bridge Control register located at location 3Eh is set. The legal values are as shown in Table 1.

DEVSEL# Timing bits 6 and 7 specify the DEVSEL# timing speed for the bridge in receiving upstream transactions going from the secondary bus to the primary bus during any selection, and its legal values are as shown.

The Reset column of Table 1 designates the default value for the DEVSEL# timing register and the Access column indicates the applicable types of operations, which are read and/or write operations.

Before explaining the use of the DEVSEL# Timing register, the PC Architecture Legacy Support register corresponding to DEVSEL# Timing bits 2 and 3 are further by Table 2 below.

| PC Architecture Legacy Support | I/O Port Addresses Decoded | Reset Value | Access |
|---|---|---|---|
| 0<br>Master DMA | 0C0–0DE | 0 | R/W |
| 1<br>Slave DMA | 000–00F | 0 | R/W |

-continued

| PC Architecture Legacy Support | I/O Port Addresses Decoded | Reset Value | Access |
|---|---|---|---|
| 2<br>DMA Page registers | 081–08B | 0 | R/W |
| 3<br>Master Interrupt | 020–021 | 0 | R/W |
| 4<br>Slave Interrupt | 0A0–0A1 | 0 | R/W |
| 5<br>PIT #1 | 040–043 | 0 | R/W |
| 6<br>PIT #2 | 048–04B | 0 | R/W |
| 7<br>Keyboard/mouse | 060–064 | 0 | R/W |
| 8<br>System control Port B | 061 | 0 | R/W |
| 9<br>System control Port A | 092 | 0 | R/W |
| 15:10<br>Reserved | Read as 0. | 0 | R/W |
| 16<br>IDE, Primary port | 1F0–1F7, 3F6 | 0 | R |
| 17<br>IDE, Secondary port | 170–177, 376 | 0 | R/W |
| 18<br>Serial Port 1 | 3F8–3FF | 0 | R/W |
| 19<br>Serial Port 2 | 2F8–2FF | 0 | R/W |
| 20<br>Parallel Port 1 | 3BC–3BE | 0 | R/W |
| 21<br>Parallel Port 2 | 378–37A | 0 | R/W |
| 22<br>Parallel Port 3 | 278–27A | 0 | R/W |
| 23<br>Floppy | 3F0–3F5, 3F7 | 0 | R/W |
| 30:24<br>Reserved | Read as 0 | 0 | R |
| 31<br>ISA Decode Aliasing Disable | This bit determines whether the AMD PCI Bridge Core aliases Legacy addresses as old style ISA systems would have. The default state of this bit after reset is 0.<br>0 - Aliasing is not disabled for bits enabled in this register. All address combinations in which AD[9:0] would match a legacy address are decoded as a match.<br>1 - Aliasing is disabled for bits enabled in this register only. The AMD PCI Bridge Core does a full 32 bit decode to determine a match to a legacy address. | 0 | R/W |

Table 2 lists the bits of the PC Architecture Legacy Support register and their representation, the corresponding I/O Port Addresses, the reset value, and the type of access. Each type of device or registers has a corresponding I/O port address. Bit 31 is different from all other bits in that it is a ISA Decode Aliasing Disable bit. If this bit is not set ("0"), only the first 10 bits [9:0] are matched for legacy address matching. If this bit is set ("1"), the full 32 bits are decoded to match a Legacy address. In addition to the address ranges defined above, there is a VGA enable bit (bit 3) defined in the Bridge Control register (at address 3Eh, FIG. 4). If this bit is set, the address ranges, 03Bh to 3BBh and 3C0h to 3DFh, are decoded as well. The method in decoding these two address ranges are affected by bit 31 (aliasing enable bit) of the Legacy Support register as well.

Figure 5A:
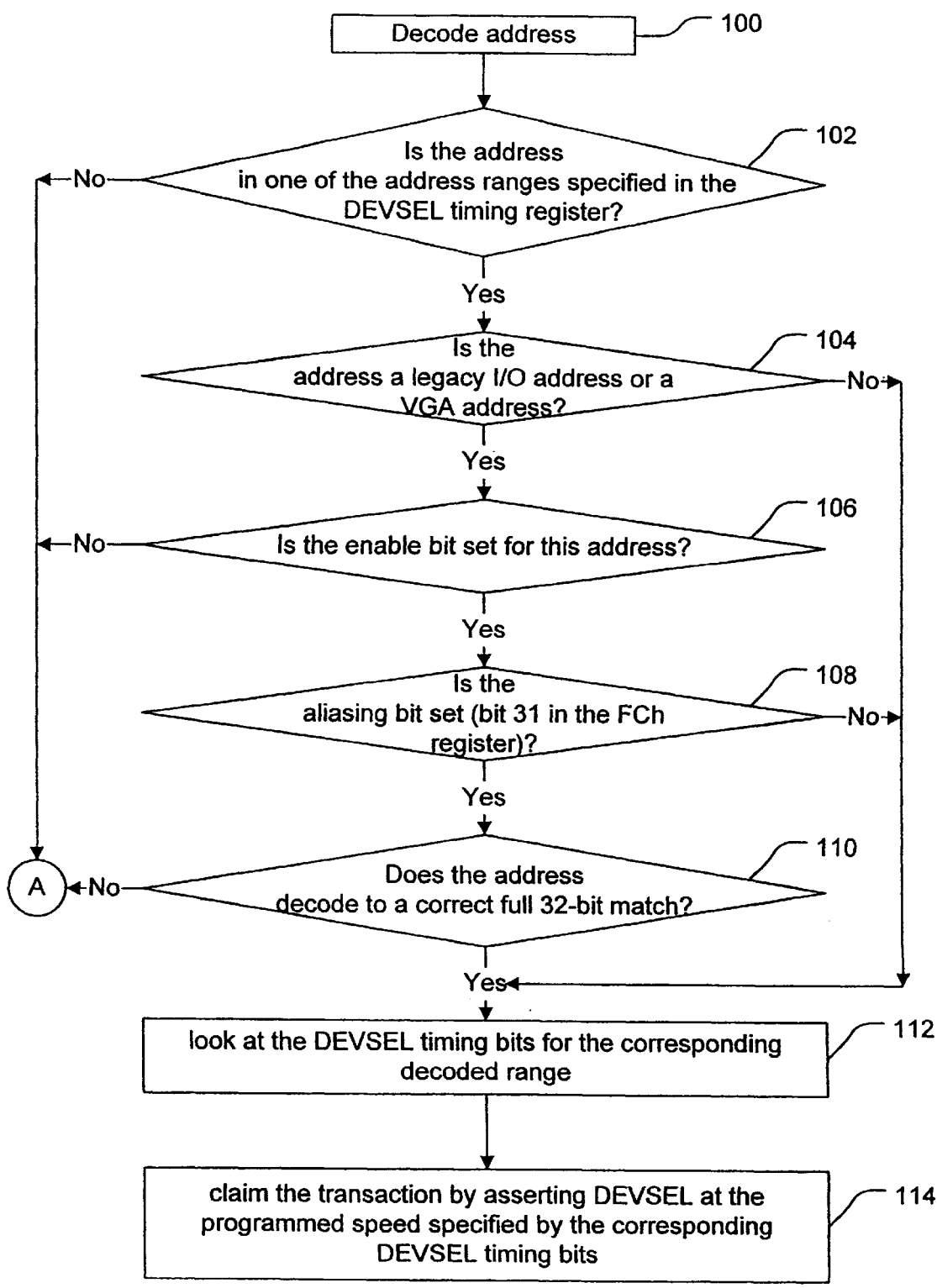
FIGS. 5a and 5b show a flow chart illustrating the steps of a preferred embodiment of the present invention.
Figure 5B:
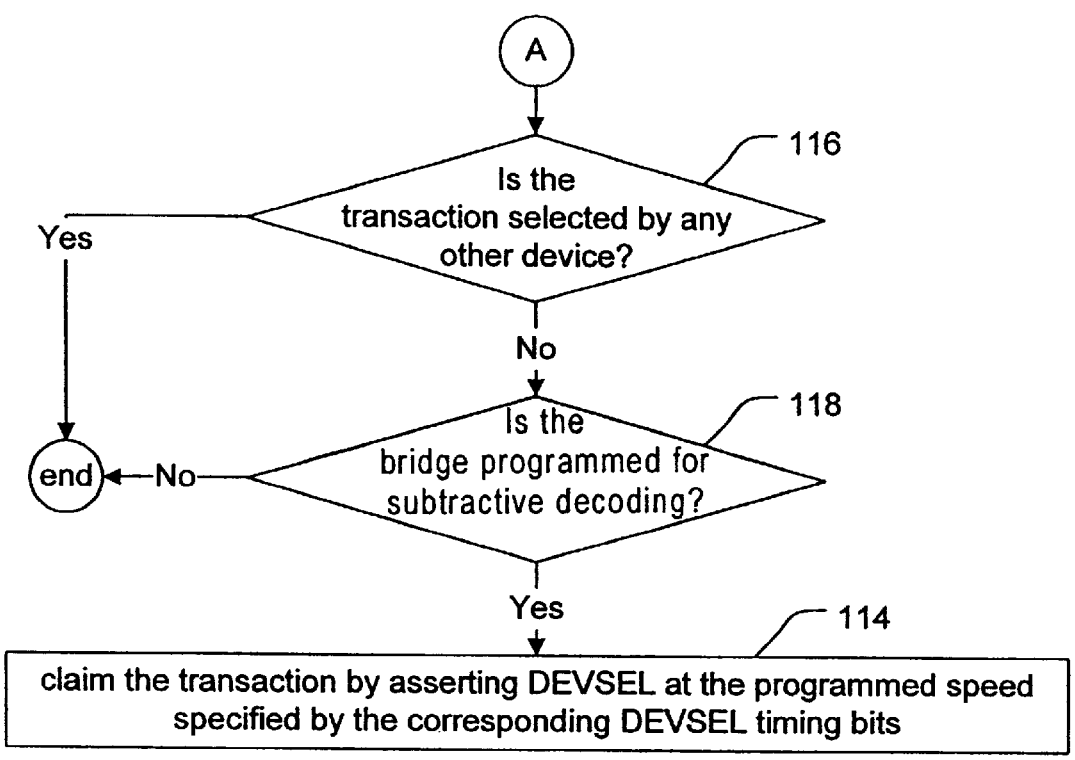

Referring to FIG. 5a, a preferred method of the present invention is illustrated utilizing the registers described above. In a first step 100, the address propagated on the bus is decoded to determine whether the address is in one of the address ranges specified in the DEVSEL# Timing register. If the address is not in one of the address ranges, this transaction is not intended for the bus bridge and the process continues at connector A (FIG. 5b). If the address is in one of the address ranges, the next step is to check if this address is a Legacy address 104. If the address is not a Legacy address, the processing continues at step 112. Otherwise, the corresponding bit in the PC Architecture Legacy Support register is checked. If the enable bit for the address is not set 106, the process continues at connector A (FIG. 5b). If the bit is set 106, enabling the corresponding legacy device or operation, the aliasing bit (bit 31 of the PC Architecture Legacy Support register) is checked to see if ten bits or the full 32 bits should be used to match the address 108. If 32 bits are to be used, the address is verified to ensure that it correctly decodes to a full 32 bit match 110. Otherwise, the process continues at connector A (FIG. 5b). At this point (step 112), there is a decoded address corresponding to an address range and the DEVSEL# Timing register specifies the DEVSEL# timing for this particular address range. In the next step (step 114), the transaction is claimed by the bus bridge at the specified speed by asserting the DEVSEL# signal at the specified speed.

Referring to FIG. 5b, at steps 116 and 118, the process flow check for subtractive decoding. If the transaction is selected by any other device 116, there is no need to further check for subtractive decoding and the process ends. If the transaction is not selected by any other devices 116, the next step 118 is to check for any address ranges programmed for subtractive decoding. If there are no address ranges programmed for subtractive decoding, the process ends. Otherwise, the process continues to step 114 to claim the transaction.

Although the present invention has been described in terms of a specific embodiment it is anticipated that alterations and modifications thereof will no doubt become apparent to those skilled in the art. It is therefore intended that the following claims be interpreted as covering all such alterations and modifications as fall within the true spirit and scope of the invention.

We claim:

1. A computer method for efficient claiming of transactions on a computer data bus by a bus bridge device having programmable timing speed for claiming the transactions, comprising the steps of:

receiving an address representing a transaction on said data bus;

decoding said address into one of a plurality of address ranges programmed in said bridge device, at least one of said plurality of address ranges corresponds to a legacy device address range assigned for legacy devices;

determining if the decoded address is in the legacy device address range corresponding to a legacy device, determining if the legacy device address range for the legacy device is enabled;

determining a timing speed for the transaction corresponding to said decoded address in accordance with the legacy device address range if the legacy device address range is enabled; and asserting a signal for claiming the transaction at said determined timing speed.

2. A computer method as recited in claim 1 further including the steps of:

determining if an aliasing function is enabled; and using 32-bit decoding for decoding said address if said aliasing function is enabled.

3. A computer method as recited in claim 1 wherein said bus bridge device has one or more registers for programming said timing speeds and for providing for said legacy devices.

4. A computer method as recited in claim 1 wherein said bus bridge device has a programmable device-select register for indicating timing speeds for said plurality of address ranges.

5. A computer method as recited in claim 4 wherein said plurality of address ranges include memory address ranges.

6. A computer method as recited in claim 1 wherein said bus bridge device has a programmable legacy device support register for indicating enabling of support for the respective legacy devices.

7. A computer method as recited in claim 2 wherein said bus bridge device has an aliasing enable register for indicating enabling of 32-bit address decoding.

8. An improved bus bridge in a computer system for connecting a first data bus and a second data bus, said bus bridge having means for connecting said first and second buses, means for receiving an address representing a transaction on said first bus, means for decoding said address, means for claiming the transaction on said first bus corresponding to said address, and means for passing said transaction to said second bus, wherein the improvement comprises:

means for determining if said address decodes into one of a plurality of address ranges programmed in said bridge device, at least one of said plurality of address ranges corresponds to a legacy device address range assigned for legacy devices;

means for determining if the decoded address is in the legacy device address range corresponding to a legacy device, means for determining if the legacy device address range for the legacy device is enabled;

means for determining a timing speed for the transaction corresponding to said decoded address in accordance with the legacy device address range if the legacy device address range is enabled; and means for asserting a signal for claiming the transaction at said determined timing speed.

9. An improved bus bridge as recited in claim 8 further including:

means for determining if a predefined aliasing function is enabled; and means for using 32-bit decoding for decoding said address if said aliasing function is enabled.

10. An improved bus bridge as recited in claim 8 further including one or more registers for programming said timing speeds and for providing for said legacy devices.

11. An improved bus bridge as recited in claim 8 further including a programmable device-select register for indicating timing speeds for said plurality of address ranges.

12. An improved bus bridge as recited in claim 11 wherein said plurality of address ranges include memory address ranges.

13. An improved bus bridge as recited in claim 8 further including a programmable legacy device support register for indicating enabling of support for the respective legacy devices.

14. An improved bus bridge as recited in claim 9 further including an aliasing enable register for indicating enabling of 32-bit address decoding.

\* \* \* \* \*